United States Patent [19]

Gross et al.

[11] Patent Number: 4,891,150

[45] Date of Patent: Jan. 2, 1990

[54] LIQUID SANITARY CLEANSING AND DESCALING AGENTS AND PROCESS FOR THEIR PRODUCTION

[75] Inventors: Wolfgang Gross, Mutterstadt; Manfred Mueller, Frankenthal-Moersch; Harald Ahnsorge, Ludwigshafen-Oppau; Andrea Zott, Ludwigshafen, all of Fed. Rep. of Germany

[73] Assignee: Joh. A. Benckiser GmbH, Ludwigshafen, Fed. Rep. of Germany

[21] Appl. No.: 936,379

[22] Filed: Dec. 1, 1986

[30] Foreign Application Priority Data

Dec. 5, 1985 [DE] Fed. Rep. of Germany ....... 3542970

[51] Int. Cl.$^4$ .......................... C11D 3/20; C11D 7/26; C23F 4/04
[52] U.S. Cl. ........................................ 252/142; 134/3; 252/82; 252/87; 252/148
[58] Field of Search .................. 252/80, 82, 142, 148, 252/87; 134/3

[56] References Cited

U.S. PATENT DOCUMENTS

| | | | |
|---|---|---|---|
| 3,277,008 | 10/1966 | Heit | 252/82 |
| 3,318,815 | 5/1967 | Remler et al. | 252/142 |
| 4,032,466 | 6/1977 | Otrhalek et al. | 252/142 |
| 4,264,463 | 4/1981 | Kotake et al. | |
| 4,522,738 | 6/1985 | Magid et al. | 252/142 |

FOREIGN PATENT DOCUMENTS

| | | | |
|---|---|---|---|
| 3042507 | 5/1981 | Fed. Rep. of Germany | 252/82 |
| 150899 | 8/1985 | Japan | 252/82 |
| 896159 | 5/1962 | United Kingdom | 252/142 |
| 1443244 | 7/1976 | United Kingdom | |
| 2106927 | 4/1983 | United Kingdom | 252/142 |

Primary Examiner—Paul Lieberman
Assistant Examiner—Linda D. Skaling
Attorney, Agent, or Firm—Foley & Lardner, Schwartz, Jeffery, Schwaab, Mack, Blumenthal & Evans

[57] ABSTRACT

A cleansing and descaling agent is disclosed which includes citric acid and thickeners. The thickeners are chosen from a group including an alkyl alcohol ethersulfate, an amphoteric surfactant, a nonionic surfactant, an amine or alkoxylated amine and a combination thereof. Additionally, additives such as salts and perfumes can be added. The present invention also includes a process for producing the present descaling agent and a process for using the present descaling agent.

12 Claims, No Drawings

LIQUID SANITARY CLEANSING AND DESCALING AGENTS AND PROCESS FOR THEIR PRODUCTION

BACKGROUND OF THE INVENTION

The present invention relates to a liquid sanitary cleansing and descaling agent or an agent for removing lime scale, urine scale and the like, which agent can be used particularly for cleansing toilets and other sanitary installations.

For a long time, aqueous solutions of hydrochloric acid or other mineral acids and formic acid or amidosulfonic acids have been used as descaling agents for sanitary installations and in particular toilet bowls and wash basins.

The known liquid agents contain the particular acid at a concentration of about 5% to 10%. In certain applications, mixtures of several acids, in particular hydrochloric acid with phosphoric acid, are also used. These agents contain additives such as acid-stable detergents, viscosity-increasing agents (thickeners), dyes and scents, as disclosed in German Application No. 2,359,095.

These agents are very effective in the removal of deposits of lime scale and urine scale. Bacteria and unpleasant odors, which form predominantly on the deposits of lime and urine scale, are also removed by these agents.

The most frequently used relatively strong acids, such as hydrochloric acid, phosphoric acid and formic acid, are grouped in the German water pollution class 1. Formic acid use has recently been increasing. In addition, phosphoric acid has a eutrophicating effect. Hydrochloric acid and formic acid are regarded as strong eye, respiratory tract and mucosa irritants. This characteristic accounts for the fact that liquid toilet cleansers which contain these acids can be identified even by their pungent and acrid smell.

Furthermore, it is very difficult to perfume the above-mentioned acids. The 5% to 10% acid concentrations normally used prevent the perfuming ingredient from remaining stable during prolonged storage periods. Moreover, only a few individual scents are suitable for perfuming these solutions.

German Patent Appl. No. 2,855,822 discloses cleansers for the sugar industry based on organic polycarboxylic acids which admittedly do not belong in the water pollution class 1. These cleansers are less irritating to the skin, mucosa and eyes and do not have a pungent odor. However, these cleansers perform unsatisfactorily with respect to the removal of lime scale and urine scale deposits. Attempts have therefore been made to improve the effectiveness of the polycarboxylic acids by an addition of $AlCl_3$ and $FeCl_3$. However, this measure is insufficient for reliable removal of the deposits in the toilet.

The liquid toilet cleansers are thickened in order to boost the action of the acids. The thickened cleansing liquid moves more slowly down vertical or inclined surfaces as a result of the higher viscosity of the solution. This provides a longer period of action of the acids so that an increase in performance is obtained, particularly in the dissolution of lime. Since strong acids and thickeners are in many cases incompatible, the possible combinations of the two groups that yield acceptable results are severely restricted.

Nonylphenol ethoxylates, which also act as surfactants, are frequently used for thickening the acid solutions. These surfactants, which are regarded as difficult to degrade biologically, must in general be employed in high concentrations of between about 6% to 10% in order to be effective. It is therefore desirable to replace nonylphenol ethoxylates by other, less polluting thickeners.

Typical pure thickeners, such as guar flour or xanthan gum are not sufficiently stable in these acid media during storage and can therefore not be used. At moderate temperatures of about 36° C., products using these pure thickeners become highly mobile in less than one week.

German Application No. 2,359,095, mentioned above, discloses the thickening with alkoxylated amines of mineral acid based cleansers. Relatively expensive solubilizers must be added to solutions that are thickened with alkoxylated amines in order to avoid phase separation of perfume oils during short storage periods. Frequently, larger quantities of thickener are then used in order to obtain the desired viscosity.

SUMMARY OF THE INVENTION

It is therefore an object of the present invention to develop a liquid sanitary cleanser, in particular a toilet cleanser, which allows for all the aspects of protection for the environment and the consumer.

It is also an object of the present invention to develop a liquid sanitary cleanser in which the raw materials used are readily degradable.

It is a further object of the invention to provide a cleanser that is capable of causing no more than minimal irritation of the skin, mucosa or eyes in the event of misuse by the consumer.

Another object of the invention is to provide a cleansing agent which has a neutral odor, in order to avoid the adverse effects associated with the perfuming of the end product.

Yet another object is to provide a low cost, highly effective product.

It is still another object of the present invention to develop sanitary cleansing liquids which contain at most minor quantities of relatively strong acids such as hydrochloric acid, phosphoric acid and formic acid.

It is also an object of the present invention to provide a cleansing liquid which has a viscosity of at least between about 50 to 350 mPa.

In accordance with one aspect of the present invention these objects are achieved by a cleansing and descaling agent, comprising: at least one acid in aqueous solution and a thickener, wherein the at least one acid comprises citric acid.

In accordance with another aspect of the present invention these objects are achieved by using the present cleansing and descaling agent as a liquid sanitary cleansing agent, in particular for cleansing toilets.

In accordance with yet another aspect of the present invention, these objects are achieved by a process for producing a cleansing and descaling agent which comprises the steps of:
(a) dissolving a predetermined amount of thickeners in water to form a solution;
(b) stirring the solution;
(c) adding citric acid to the solution while stirring; and
(d) stirring the solution until a homogeneous solution which has a viscosity of between about 50 and 350 mPa is formed wherein the predetermined amount is an amount which produces the above viscosity.

In accordance with a further aspect of the present invention, these objects are achieved by a process for using citric acid as a cleansing and descaling agent for a toilet bowl. This process includes the steps of:

(a) providing a cleansing and descaling agent which comprises, citric acid and a surfactant thickener, the agent has a viscosity of between about 50 and 350 mPa;

(b) contacting the agent with a scale encrusted portion of the toilet bowl; and (c) removing the agent together with the loosened scale by flushing the toilet bowl with water.

Other objects, features and advantages of the present invention will become apparent from the following detailed description.

DETAILED DESCRIPTION OF THE PREFERRED EMBODIMENTS

One essential feature of the present invention is the use of citric acid. Citric acid is readily degradable and is a substance which does not pollute water. Moreover, citric acid as a foodstuff is non-toxic and well tolerated by humans. The lime-dissolving effect of citric acid is sufficient for this application. The thickening of citric acid necessary for use in sanitary cleansing liquids to viscosities of at least from about 50 to 350 mPa, preferably from about 100 to 250 mPa, was at most partly achievable with existing means. However, it was possible to solve this problem by means of surfactant thickeners not previously used for this purpose, and in some cases by combinations of these thickeners.

(1) Thickening with alkyl alcohol ether-sulfates

Surprisingly, citric acid can be thickened with alkyl alcohol ether-sulphates and inorganic, water-soluble salts such as sodium chloride and ammonium chloride. In the case of stronger acids such as hydrochloric acid, acceptable thickening is not achieved because the alkyl alcohol ethersulfate molecules are cleaved by the stronger acid. The cleaved molecules lead to a lowering of viscosity and eventually even to phase separation. By contrast, the formulations of the present invention remain stable during storage tests at about 40° C. over several weeks. The quantities of the alkyl alcohol ether-sulfates used are of the order of from about 1% to 10%, but preferably from 2% to 6%, and the quantities of the salts are from about 1% to 10%.

Alkyl alcohol ether-sulfates are here understood as compounds of the formula 1

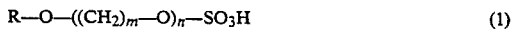

(1)

in which

R is an alkyl chain having from 10 to 22, preferably from 14 to 18, carbon atoms, m is a number from 2 to 4 and n is a number from 1 to 5, preferably from 2 to 3.

(2) Thickening with amphoteric surfactants

A very good thickening action can also be obtained with amphoteric surfactants. Due to synergistic effects, the concentration of the amphoteric surfactants used can be reduced if the surfactants are combined with amines, alkoxylated amines, amine oxides, alkoxylated amine oxides, quaternary amines and non-ionic surfactants. The concentration of the amphoteric surfactant is from about 0.1% to 10%, and preferably from 0.5% to 5%. In most cases, the viscosity can be increased by the addition of inorganic salts in an amount between 0.1% and 10%.

The substance classes of alkylbetaines and alkylsulfobetaines of the following formulae 2 and 3 are particularly suitable as the amphoteric surfactants:

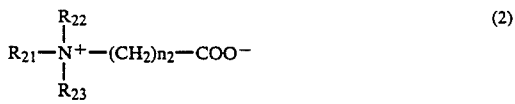

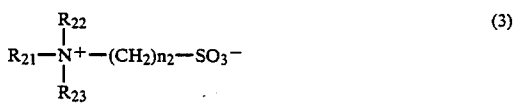

wherein $R_{21}$ is an alkyl chain having from 10 to 22, preferably from 14 to 18, carbon atoms, and $R_{22}$ and $R_{23}$ are short-chain alkyl radicals $(CH_2)_{n_2}$ where $n_2$ is a number from 1 to 5 or ethoxylated or propoxylated chains $(CH_2CH_2O)_{n_3}$ or $(CH_2-CH_2CH_2O)_{n_3}$ respectively, where $n_3$ is a number from 1 to 5.

(3) Thickening with non-ionic surfactants

In accordance with the object of developing a toilet cleanser which causes little pollution of the environment, formulations with the least possible surfactant content are the target. As a rule, when non-ionic surfactants are used, undesirably high surfactant concentrations are necessary. Surprisingly, however, combinations of ethoxylated or propoxylated long-chain alcohols with ethoxylated or propoxylated amines, quaternary amines and/or ethoxylated or propoxylated quaternary amines lead to highly viscous end products, even if used in small quantities.

The concentrations of the non-ionic surfactants are in the range from about 0.1% to 5%, preferably from 0.5% to 3%, and the concentrations of the ethoxylated or propoxylated amines, quaternary amines and ethoxylated or propoxylated quaternary ammonium salts are in the range from about 0.1% to 5%, preferably from 0.5% to 3%. Here again, the viscosity can frequently be raised further by the addition of salts.

Non-ionic surface-active substances with a hydrophobic radical joined to a polyalkoxylated chain are here understood as polyalkoxylated (for example polyethoxylated or polypropoxylated) surface-active substances. Examples of these are: alkoxylated fatty alcohols and alkoxylated fatty acids, and in particular fatty alcohol ethoxylates having a chain of from 10 to 18 carbon atoms and a degree of ethoxylation (EO) from 1 to 12, and preferably a carbon chain length of from 13 to 15 and a degree of ethoxylation from 5 to 9.

(4) Thickening with amine oxides

Amine oxides and ethoxylated or propoxylated amine oxides in combination with amines also result in very effective thickening of the end products. The addition of small quantities of non-ionic surfactants and/or inorganic salts here has another positive effect.

Amine oxides, alkoxylated amine oxides and amines are here present in concentrations from 0.1% to 10%, preferably in concentrations from 0.3% to 5%. The concentrations of the non-ionic surfactants and the inorganic salts are preferably below 5%.

Amine oxides and alkoxylated amine oxides are to be understood as compounds of the following formula 4

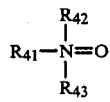

(4)

in which
- $R_{41}$ is an alkyl chain having from 10 to 22, preferably from 12 to 18, carbon atoms, and
- $R_{42}$ and $R_{43}$ can be either identical or different and can be H, lower alkyl radicals having from 1 to 4 carbon atoms or ethoxylated or propoxylated chains $(CH_2-CH_2-CH_2O)_{n_4}$ or $(CH_2-CH_2O)_{n_4}$ respectively where $n_4$ is a number from 1 to 5.

Amines and alkoxylated amines are understood to be compounds of the formula 5

(5)

in which
- $R_{51}$ is an alkyl chain having from 10 to 22, preferably from 12 to 19, C atoms, and
- $R_{52}$ and $R_{53}$ can be either identical or different and are alkyl radicals having from 1 to 4 C atoms or ethoxylated or propoxylated chains $(CH_2CH_2O)_{n_5}$ or $(CH_2CH_2CH_2O)_{n_5}$ is a number from 1 to 5.

Combinations of two and more of the above-mentioned surfactant types also lead to the desired result. In addition, inorganic water-soluble salts, such as sodium chloride or ammonium chloride, in quantities from 1% to 10%, preferably from 1% to 5%, again reinforce the thickening effect.

The above-mentioned thickener systems also have a thickening action when dicarboxylic acids such as glutaric acid, adipic acid and malic acid are used in place of citric acid or mixtures of citric acid and dicarboxylic acids or different dicarboxylic acids are used.

Mixtures of citric acid and hydrochloric acid, phosphoric acid, formic acid and amidosulfonic acid can also be thickened by means of the above-mentioned thickener systems.

The thickening properties also apply to systems which comprise citric acid and dicarboxylic acid, the acid action of which is reinforced by cation or Lewis acids such as $AlCl_3$ or $FeCl_3$.

The addition of cation acids in a quantity of from about 10% to 50% of the acid quantity (citric acid, dicarboxylic acid) is particularly effective, since the pH is lowered only relatively slightly. In contrast, the addition of strong acids such as hydrochloric acid lead to extensive lowering of pH, without significant improvements in performance of the dissolution of lime as compared with cation acid activation. The addition of strong acids also has the adverse consequence of intensifying the irritation of the skin, mucosa and eyes in the event of misuse. Moreover, activation with cation acids has no adverse effect on odor and thus advantages for perfuming the product.

The cleansing agents according to the invention are preferably to be used as liquid, water closet cleansers. If appropriate, they can contain further additives, such as dyes, pigments, scents and corrosion inhibitors, preferably in a quantity of about 0.5% by weight relative to the agent, and/or bactericides such as quaternary ammonium compounds, for example benzyldodecyltrimethylammonium chloride, which can be used in a quantity of 5% by weight or less, preferably 2% by weight or less, relative to the agent.

The invention also relates to a process for producing the claimed agent, which comprises dissolving the thickeners and, if appropriate, further additives in water with stirring and adding the citric acid to this solution with stirring, until the solution is homogeneous.

Additionally, the invention includes a process for using citric acid as a cleansing and descaling agent for a toilet bowl. This process includes the steps of:
(a) providing a cleansing and descaling agent which comprises, citric acid and a surfactant thickener, the agent has a viscosity of between about 50 and 350 mPa;
(b) contacting the agent with a scale encrusted portion of the toilet bowl; and
(c) removing the agent together with the loosened scale by flushing the toilet bowl with water.

The end viscosity of the agent is controlled by the quantity of thickener, which is added in a sufficient quantity in order to reach the desired viscosity of from about 50 to 350 mPa. The viscosity was measured with a Hoeppler falling-ball viscometer.

It is possible to incorporate bactericides in the formulation without the flow properties being modified as a result.

Cleansing agents according to the invention, which are particularly useful for cleansing toilets, are compiled in the tables below.

TABLE 1

| Formulation No. | Formulation Examples of Liquid Toilet Cleansers | | | | | | | |
|---|---|---|---|---|---|---|---|---|
| | 1 | 2 | 3 | 4 | 5 | 6 | 7 | 8 |
| Dicarboxylic acid type (SOKALAN ® DCS) | | | | | | | | |
| Citric Acid × $H_2O$ | 6.35 | 6.35 | 6.35 | 6.35 | 6.35 | 10.0 | 10.0 | 10.0 |
| Aluminum chloride × $6H_2O$ | | | | | | | | |
| Formic acid | | | | | | | | |
| Hydrochloric acid | | | | | | | | |
| Amphoteric surfactant (Rewoteric V 1444) | 8 | 1.8 | 0.8 | 0.8 | 0.8 | | | |
| Tertiary amine (ARMEEN ® DMOD) | — | — | 1.0 | — | — | 1.0 | 1.0 | |
| Ethoxylated amine (ETHOMEEN ® S 12) | — | — | — | — | 1.0 | — | — | 2.5 |
| Ethoxylated amine oxide (Aromax T 12) | — | — | — | 1.23 | — | — | 1.0 | |
| Amine oxide (WS ® 35) | — | — | — | — | — | 1.0 | | |
| Quaternary ammonium salt | | | | | | | | |

TABLE 1-continued

| | Formulation Examples of Liquid Toilet Cleansers | | | | | | | |
|---|---|---|---|---|---|---|---|---|
| Formulation No. | 1 | 2 | 3 | 4 | 5 | 6 | 7 | 8 |
| (ARQUAD ® S 50) | | | | | | | | |
| Nonionic surfactant (Dobanol 45-7") | — | — | — | — | — | — | — | 1.0 |
| Alkyl ether-sulfate (Genapol LRO) | | | | | | | | |
| Electrolytes: | | | | | | | | |
| (NaCl) | — | 3.5 | 1.5 | 1.0 | 3.0 | 5.0 | 2.0 | 4.0 |
| (NH₄Cl) | | | | | | | | |
| Perfume | 0.2 | 0.2 | 0.2 | 0.2 | 0.2 | 0.2 | 0.2 | 0.2 |
| Viscosity about mPa × s (Hoeppler/Glassball) | 220 | 105 | 216 | 300 | 174 | 190 | 140 | 160 |

TABLE 2

| | Formulation Examples of Liquid Toilet Cleansers | | | | | | | | |
|---|---|---|---|---|---|---|---|---|---|
| Formulation No. | 9 | 10 | 11 | 12 | 13 | 14 | 15 | 16 | 17 |
| Dicarboxylic acid type (SOKALAN ® DCS) | — | — | — | — | 10.0 | 6.35 | 6.35 | 6.35 | 6.35 |
| Citric Acid × H₂O | 6.35 | 6.35 | 10.0 | 6.35 | — | | | | |
| Aluminum chloride × 6H₂O | 3.65 | 3.65 | — | 3.65 | 3.65 | 3.65 | 3.65 | — | |
| Formic acid | — | — | — | — | — | — | — | 2.0 | |
| Hydrochloric acid | — | — | — | — | — | — | — | — | 2.0 |
| Amphoteric surfactant (Rewoteric V 1444) | 0.5 | — | — | — | — | 4.0 | — | 0.8 | |
| Tertiary amine (ARMEEN ® DMOD) | 1.5 | — | — | — | — | — | — | 1.0 | |
| Ethoxylated amine (ETHOMEEN ® S 12) | — | 2.0 | — | — | — | — | 4.0 | — | 2.0 |
| Ethoxylated amine oxide (Aromax T 12) | | | | | | | | | |
| Amine oxide (WS ® 35) | | | | | | | | | |
| Quaternary ammonium salt (ARQUAD ® S 50) | | | | | | | | | |
| Nonionic surfactant (Dobanol 45-7") | — | 1.0 | — | — | — | — | 1.0 | — | 1.0 |
| Alkyl ether-sulfate (Genapol LRO) | — | — | 3.15 | 3.15 | 6.3 | | | | |
| Electrolytes: | | | | | | | | | |
| (NaCl) | — | 1.0 | 8.0 | — | 8.0 | 2.5 | 5.0 | 2.0 | 1.3 |
| (NH₄Cl) | — | — | — | 2.5 | | | | | |
| Perfume | 0.2 | 0.2 | 0.2 | 0.2 | 0.2 | 0.2 | 0.2 | 0.2 | 0.2 |
| Viscosity about mPa × s (Hoeppler/Glassball) | 300 | 210 | 130 | 250 | 200 | 194 | 163 | 167 | 194 |

What is claimed is:

1. A cleansing and descaling agent, consisting essentially of:

organic carboxylic acid in aqueous solution and a thickener, wherein said organic carboxylic acid comprises citric acid in a quantity of between about 5% and about 10% and wherein said thickener consists essentially of at least one member selected from the group consisting of:

(a) from about 0.1 to about 10% of an alkyl alcohol ether-sulfate of the formula 1

$$R-O((CH_2)_m-O)_n-SO_3H \quad (1)$$

wherein
R is an alkyl chain having from 10 to 22 carbon atoms,
n is a number from 1 to 5 and
m is a number from 2 to 4;
in combination with an inorganic water-soluble salt in a quantity between about 1.0 and 10%

(b) from about 0.1 to about 10% of an amphoteric surfactant of the formula 2 or 3

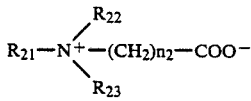

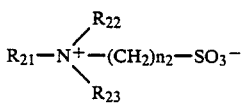

wherein
$R_{21}$ is an alkyl chain having from 10 to 22 carbon atoms, and
$R_{22}$ and $R_{23}$ are a short-chain alkyl radical $(CH_2)_n$ where $n_2$ is a number from 1 to 4 or an ethoxylated or propoxylated chain $(CH_2CH_2O)_{n3}$ wherein $n_3$ is a number from 1 to 5;

(c) a combination of from about 0.1 to about 5% ethoxylated or propoxylated long chain alcohols with from about 0.1 to about 5% of at least one selected from the group consisting of ethoxylated amines, propoxylated amines, quaternary amines, ethoxylated quaternary amines and propoxylated quaternary amines; or (d) a combination of an amine oxide or alkoxylated amine oxide of the formula 4

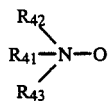 (4)

wherein $R_{41}$ is an alkyl chain having from 10 to 22 carbon atoms, and $R_{42}$ and $R_{43}$ can be an H, a lower alkyl radical having from 1 to 4 carbon atoms or an ethoxylated or propoxylated chain $(CH_2CH_2O)_{n_4}$ or $(CH_2-CH_2-CH_2O)_{n_4}$ wherein $n_4$ is a number from 1 to 5;

with an amine or alkoxylated amine of the formula 5

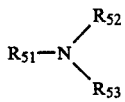 (5)

wherein $R_{51}$ is an alkyl chain having from 10 to 22 carbon atoms, and $R_{52}$ and $R_{53}$ can be an alkyl radical having from 1 to 4 carbon atoms or an ethoxylated or propoxylated chain $(CH_2CH_2O)_{n_5}$ or $(CH_2CH_2CH_2O)_{n_5}$ where $n_5$ is a number from 1 to 5;

wherein the thickener is present in a quantity sufficient provide an agent viscosity of at least between about 50 and 350 mPa.

2. The agent of claim 1, wherein said acid further comprises a dicarboxylic acid in a quantity of up to about 10%.

3. The agent of claim 1, wherein citric acid is present together with a Lewis acid present in an amount of 10 to 50% of the citric acid, which acid acts as an activator for citric acid.

4. The agent of claim 1, further comprising a scent, dye or corrosion inhibitor in a quantity of up to 0.5% or a bactericide in a quantity of up to 5%.

5. The agent of claim 1, wherein
   (a) R is an alkyl chain having from 14 to 18 carbon atoms and n is a number from 2 to 3;
   (b) $R_{21}$ is an alkyl chain having from 14 to 18 carbon atoms;
   (c) $R_{41}$ is an alkyl chain having from 12 to 18 carbon atoms; or
   (d) $R_{51}$ is an alkyl chain having from 12 to 19 carbon atoms.

6. The agent of claim 1, wherein said thickener of element (b) further comprises an inorganic, water-soluble salt as an additional thickener in a quantity of between 0.1% and 10%.

7. The agent of claim 6, wherein said inorganic, water-soluble salt is sodium chloride, ammonium chloride or a mixture thereof.

8. The agent of claim 3, wherein the Lewis acid is $AlCl_3$ or $FeCl_3$.

9. An agent as claimed in claim 1, wherein said thickener consists essentially of component (a).

10. An agent as claimed in claim 1, wherein said thickener consists essentially of component (b).

11. An agent as claimed in claim 1, wherein said thickener consists essentially of component (c).

12. An agent as claimed in claim 1, wherein said thickener consists essentially of component (d).

* * * * *